Patented June 2, 1925.

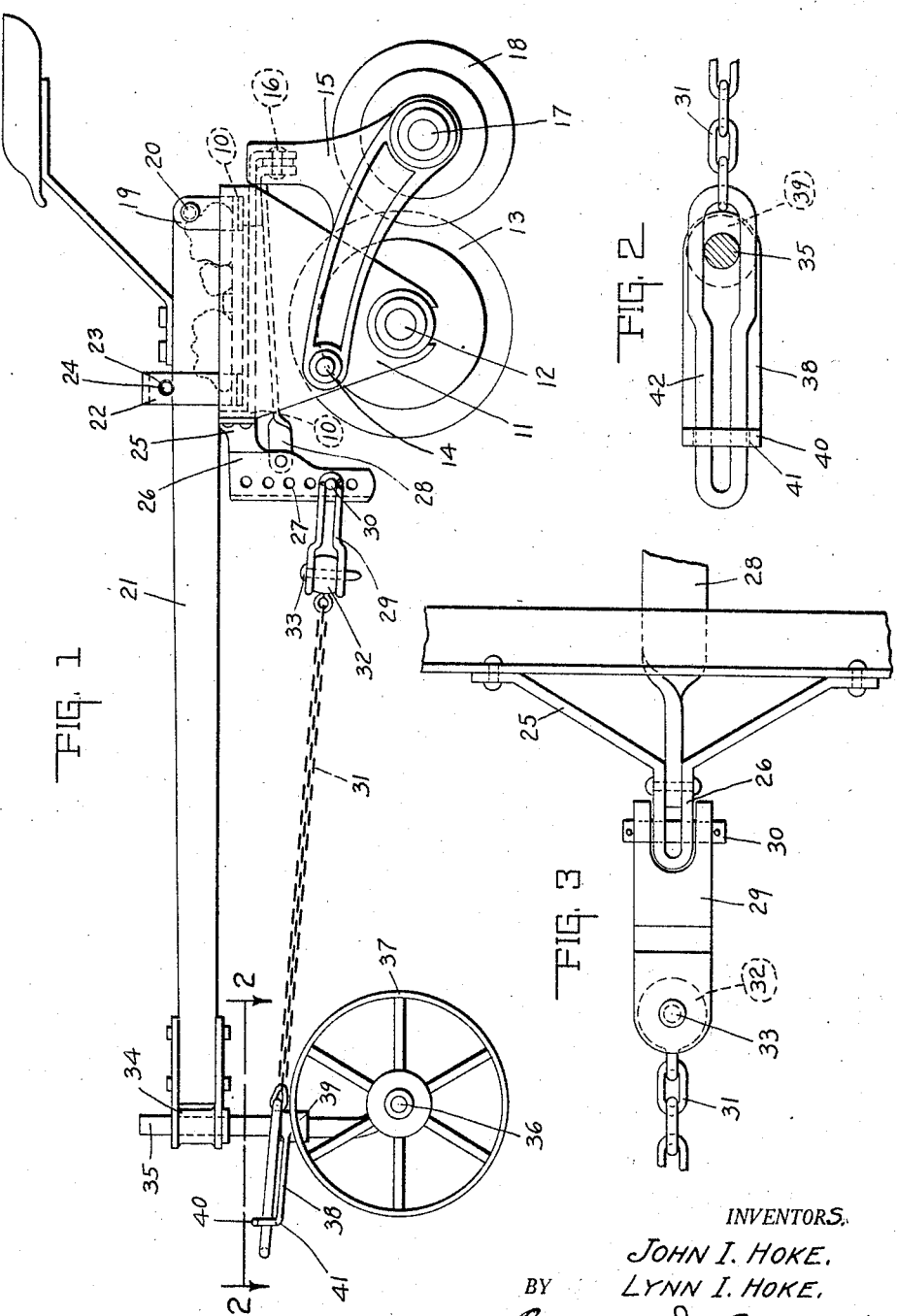

1,540,477

UNITED STATES PATENT OFFICE.

JOHN I. HOKE AND LYNN I. HOKE, OF SOUTH BEND, INDIANA.

AGRICULTURAL IMPLEMENT.

Original application filed May 28, 1921, Serial No. 473,527. Divided and this application filed August 7, 1922. Serial No. 580,018.

*To all whom it may concern:*

Be it known that we, JOHN I. HOKE and LYNN I. HOKE, citizens of the United States, and residents of South Bend, county of St. Joseph, and State of Indiana, have invented certain new and useful Agricultural Implements; and we do hereby declare that the following is a full, clear, and exact description thereof, reference being had to the accompanying drawings, in which like numerals refer to like parts.

This invention relates to agricultural implements and the chief object of the invention is to equip an agricultural implement of the packer type with a forecarriage construction, whereby the length of the draft chain is automatically adjusted to the turning movement of the agricultural implement.

Another object of the invention is to construct the draft means of the agricultural implement in such a manner that the angular movement thereof will not be transmitted to the draft animals or draft means, but will be otherwise absorbed.

One feature of the invention consists in the particular construction of the forecarriage means and its peculiar association with the agricultural implement draft connection.

This application is a division of application Serial No. 473,527, filed May 28, 1921, now Patent No. 1,424,906, dated August 8, 1922.

The full nature of this invention will be understood from the accompanying drawings and the following description and claims.

In the drawings Fig. 1 is a side elevational view of a packer embodying the features of the invention. Fig. 2 is a plan view of the forecarriage hitch and is taken on the line 2—2 of Fig. 1 and in the direction of the arrows. Fig. 3 is a top plan view of a portion of the agricultural implement and the draft chain connection.

In the drawings 10 indicates a pair of spaced and preferably parallel transverse angle members which are secured together by the triangular angle frames 11, which form the main frame of the agricultural implement. The inverted triangular side frames 11 support the shaft 12 which carries a plurality of rotatable agricultural implements 13.

Detachably and pivotally supported at 14 are a pair of side frames 15 which are suitably connected together and are pivotally supported at 16 upon the main frame construction. The auxiliary side frames 15 support an auxiliary shaft 17 associated with which are agricultural implements 18. The foregoing construction constitutes a clod crusher or packer. However, other agricultural devices may be substituted for the circular cultivating wheels 13 and 18.

Preferably midway between the side frames 11 and supported by the rear transverse angle frame member 10 is a bifurcated bracket 19 which pivotally supports at 20 a tongue 21 which extends forwardly from the framework and projects beyond the same. Suitably, but rigidly, secured to the forward angle frame member 10 is an upwardly extending loop or strap 22 which is of such dimensions that the tongue 21 extends through the same and is slidable therein when rocked on its pivotal support 20. The strap or loop 22 is provided with openings 23 adapted to receive a suitable stop or pin 24, whereby the tongue 21 will be rigidly secured to the framework hereinbefore described when desired. The last mentioned condition is especially desirable when the packer is used with but a single or main row of cultivating devices, such as the wheels 13. When the packer is to be used with a plurality of rows of cultivating wheels, such as the wheels 13 and 18, the tongue 21 is pivotally supported upon the framework so that said tongue may move in the loop 22 and thereby eliminate the transmission of all movement of the frame to the collars on the draft animals or to the draft means.

The means for varying the load between the forward and rear cultivating devices 13 and 18 will be described in detail. Suitably secured upon the framework and rigidly and medianly thereof, by means of the bracing strap member 25, is a depending front plate 26 provided with a plurality of vertically spaced holes or openings 27 therein. Suitably secured to the rear portion of the framework and extending beneath said framework is a bracing member or bar 28, the forward end of which is rigidly secured to the depending plate portion 26 to reenforce and brace the same.

Associated with said plate portion 26 is a clevis 29 which is adjustably secured upon the plate portion 23 by means of the pin 30, said pin being receivable by any one of the openings or holes 27. Associated with the clevis 29 is the usual double tree or draft chain 31, suitably secured thereto by means of the block 32 and the pin 33. Thus, the draft chain or the double tree through which the propelling power is transmitted, is adapted to be adjustably positioned with respect to the rectangular framework of the automobile, such that the line of draft may be varied in order to distribute the weight in the desired proportions to the front and rear rollers or wheels. Thus, when the pin 30 is positioned in the upper opening 27, a greater portion of the load will be carried by the front wheels 13, while when the pin 30 is positioned in the lower openings more of the load will be carried by the rear wheels 18, and when said pin 30 is medianly positioned between the aforesaid limits, the load will be distributed substantially equally between the front and rear rows of wheels.

Reference will now be had to the novel forecarriage construction associated with and connected to the forward end of the draft chain 31 and the tongue 21. The forward free end of the tongue 21 is provided with a bracket portion 34 which provides a vertical bearing for a spindle 35. The spindle 35 suitably supports an axle 36 upon the ends of which are supported the usual wheels 37. The spindle 35 is swivelly mounted in said bracket 34 and the wheels are, therefore, adapted to turn with said spindle 35. Upon the spindle 35 there is secured an outwardly and forwardly extending bracket arm 38 which is rigidly secured to said spindle by the hub portion 39. The outwardly projecting arm 38 is provided with an upward extension 40 which is suitably slotted at 41. The loop or elongated link 42 straddles the shaft 35 and extends through the opening 41 of the upward extended projection 40 of the arm 38. To the rear portion of the loop or link 42 adjacent the spindle 35 is secured the forward end of the draft chain 31. To the front or forward end of the loop 42 may be secured the draft means. Thus, when it is desired to turn the agricultural implement or packer, the traction means or team is turned. The link 42 and the arm 38 are likewise turned with said team or traction means, and since said arm is rigid with said spindle, the spindle is turned, carrying with it the forecarriage wheels. In this manner the traction means or team can execute a substantially right angle turn and thus turn the packer upon either side frame 11 as a pivot to execute a sharper turn than could otherwise be executed if the traction means or team were hitched directly to the clevis 29.

It will be noted that in said turning movement, the tension of the chain 31 is not in any way lowered for the reason that the construction shown in Fig. 2 insures self adjustment, and thus prevents shortening or lengthening of the draft chain in the turning movement. This is caused by the loop or link 42 moving arcuately about the center of the spindle 35 and thus the chain 31 does not shorten or slacken since the draft upon the other end of the loop 42 insures that said chain 31 will be maintained taut at all times. Since the tongue 21 is pivotally associated with the packer, the same has relative movement and the aforesaid loop or link 42 permits the draft means to be shortened or lengthened as required to adjust the same to maintain said draft means taut and yet permit such relative movement.

When the forecarriage structure hereinbefore described is omitted, the traction means, whether draft means or animal, is directed to the packer at the clevis 29 and a tongue is used in the customary manner, but preferably a forecarriage construction is used with power traction means.

The invention claimed is:

1. The combination of a device of the character described having a tongue, and a forecarriage construction pivotally connected to the free end of tongue for a reduced turning, a draft means connected at one end to the device and at its other end to said forecarriage and projecting beyond the latter, and a connection independent of the forecarriage and tongue pivotal connection and between the forecarriage and the projecting portion of said draft means for permitting pivotal movement of the forecarriage and the projecting portion relative to said draft means.

2. In a draft connection the combination of a forecarriage, a slotted arm, a spindle on said forecarriage supporting said arm and a loop straddling said spindle and slidably supported by said slotted arm and in the slot thereof for turning said forecarriage.

In witness whereof, we have hereunto affixed our signatures.

JOHN I. HOKE.
LYNN I. HOKE.